Patented Mar. 13, 1923.

1,448,278

UNITED STATES PATENT OFFICE.

WILLY MOELLER, OF HAMBURG, GERMANY, ASSIGNOR, BY MESNE ASSIGNMENTS, TO THE CHEMICAL FOUNDATION, INC., A CORPORATION OF DELAWARE.

TANNING MEANS, THEIR PREPARATION AND USE.

No Drawing.   Application filed February 9, 1915.   Serial No. 7,212.

*To all whom it may concern:*

Be it known that I, WILLY MOELLER, a citizen of the German Empire, and a resident of Hamburg, Germany, have invented certain new and useful Improvements in Tanning Means, Their Preparation and Use, of which the following is a specification.

It is known (see German Patent No. 262,-333) that the acid resins, which appear as waste products of mineral oil refining, can be converted into a tanning means by a simple after-treatment, which consists in removing the excess sulphuric acid which was used in the purification process.

Further researches have now shown that these tanning means are in general condensation products of sulfo-acids of the hydrocarbons which are found in petroleum, tar-oils and other mineral oils, i. e., the raw materials. This led to the making of experiments with other substances with the result that such tanning means can actually be produced by sulfonating most high molecular hydrocarbons and condensing.

That which is particularly accomplished by this determination is to make possible the production of tanning means of special properties or characteristics by making appropriate selection of starting materials, which may be either wholly or partly pure, and treating them correspondingly.

Whereas, with reference to the utilization of by-products of mineral oil refining, the small amount of sulfuric acid and the manner of its use was determined directly by the fact that the object was to refine the oil. Now, when other materials are used as starting materials, for example, naphthalene or anthracene oils, the reaction can be so regulated as to be most favorable to the production of the desired tanning means, and especially with respect to the employment of an adequate or sufficient amount of sulphuric acid, by means of which more complete sulfonation will be brought about.

In this connection the following points, especially, come into consideration:

The recovery of acid resins can be materially favored by employing condensation accelerating means, such as aldehydes, ketones, phosphorylchlorid, thionylchloride and other bodies, especially those from which the above split off. The addition of these means may take place either before or after the treatment of the hydrocarbons with sulfuric acid.

It has been found further that secondary reactions take place as the result of the alkali which is used for neutralization. The tanning means produced is also of especial value when admixed with vegetable extracts in which case it acts to increase the solubility of the extracts and also to decolor them. For the first purpose it is advisable to use an excess of alkali by which most of the condensed sulfoacids are converted into sulfo salts. But if it is desired by the use of the tanning means to bleach the vegetable extracts with which the tanning means is mixed, it is sufficient merely to neutralize the free sulfuric acid.

In order to form as great an amount as possible of the condensation product, a moderate heat is generally employed, this being continued until the product has become completely water soluble in contradistinction to the starting material, which is difficultly soluble or wholly insoluble in water.

By way of example, when raw naphthalene is used as the starting material, it is heated with 1½ to 2 parts of sulfuric acid on the water bath until the naphthalene is wholly converted into its sulfoacid. After about two hours small amounts of formaldehyde are added to the fluid mass and heating is carefully continued on the water bath. The completion of the condensation is indicated by the congealing of the mass to a solid resin easily soluble in water. Then follows the treatment with alkali in accordance with the desired effect to be produced as above explained.

Similarly, 1 part of anthracene oil may be heated on the water bath with 1½ to 2 parts of sulphuric acid, a little formaldehyde being added. The reaction will be completed in about two hours.

The production of tanning means from artificial or manufactured acid-resins of hydrocarbons, which are sulfonated and condensed has just been described, but the same reaction can be made use of by employing another raw material as a starting material, namely the waste products of the mineral oil refineries. In accordance with the method of German Patent No. 262,333, these products are converted into tanning agents by neutralization of the sulfuric acid. According to the present invention, however, the sulfuric acid is not merely neutralized but it is itself transformed into an additional amount of tanning means, by the addition to the mass, of hydrocarbon material and treatment corresponding with that above set forth.

In such case there is added to the crude acid resin, a suitable hydrocarbon such as reacts easily with concentrated sulfuric acid, the amount of this material being such that the amount of sulfuric acid present in the acid resin is capable of converting it into sulfoacid. In carrying out the process the sulfuric acid content of the acid-resin is first determined, and then there is added for example, 10 to 20% naphthalene, corresponding to the quantity of naphthalene sulfoacid which the sulphuric acid contained in the acid-resin may be able to produce, according to calculation. During the sulfonating, numerous polysulfoacids are created which in turn combine through polymerization to form complex combinations with monosulfoacids and the condensation of the present invention is carried on for the purpose of producing these complex polymerization products.

The further treatment is carried on under conditions of stirring and warming until the complete condensation of the resulting sulfoacid and with it, complete water solubility in the sense hereinabove described, is accomplished. The duration of this treatment depends wholly on the nature of the acid-resin used and correspondingly also upon the amount of the hydrocarbons added. The condensation of the resulting sulfoacids can be hastened by agents which further condensation of sulfoacids, such as aldehyde, ketone, phosphoroxychloride, thionyl chloride and other bodies, especially those from which the above split off. Moreover, this addition can be made either before or after the treatment of the mixture product.

As hereinabove referred to, I have also discovered that all of these acid-resins, including such as are produced from the waste products of oil refineries by the mere neutralization of the excess sulfuric acid, seem to develop a special and peculiar effect when applied to a certain series of vegetable tanning and dyeing or coloring substances. The acid-resins of which this is true are in general those products which are produced by the condensation of sulfonated hydrocarbons and especially those which can be obtained as hereinabove described, from natural hydrocarbons, such as found in asphalt, mineral or earth waxes, ceresin, paraffine, or from tar distillation products of coal and wood. The addition of such tanning means has a solvent or decoloring effect, or produces both effects at the same time. The vegetable tanning and dyeing substances which are benefited in a special way by the addition of these acid resins are the type represented, for example, by quebracho extract, or mangrove extract. The quebracho extract contains a large number of constituents which have inherent tanning properties but which are insoluble, and various methods and means have been tried for the purpose of bringing them into solution. I have now found that the chemical substances referred to above act upon the difficultly soluble constituents of this tanning material in such a way as to bring them into solution, thereby converting this tanning extract into products of greater commercial value.

The quantity of the chemical tanning agents added for the purpose of rendering the vegetable tanning extracts soluble is determined wholly in accordance with the desired degree of solubility of the extracts. For example, to obtain an extract which is soluble when warm and from which only a slight separation takes place in the cold, 1 to 5% of the chemical tanning agent is sufficient, while for the production of cold-soluble extracts, an addition of from 10 to 15% of sulfo-acid-resins is necessary. Moreover, the degree of solubility and the character of the tanning substance obtained is influenced according to whether the neutralization of the free sulfoacids present in the acid resins is wholly or partly accomplished; and a quicker and easier solubility of the extract is obtained the more the sulfo-acids are neutralized.

As illustrative of my invention, the following example is given: 1 kilogram of the usual, natural quebracho extract, is mixed with 100 grams of the sulfo-acid-resins while being heated on a water-bath, and thus heated until the desired solubility effect is produced. The reaction can be aided or hastened by heating the mixture under a pressure of about 2 atmospheres.

With many of the vegetable tanning extracts the addition of the specified compounds produces a decoloring. Most of the vegetable tanning extracts, particularly mangrove extract, are dark red in color and this is undesirable for tanning purposes. I have found that it is possible very easily to remove this undesirable characteristic by adding sulfo-acid-resins of the hydrocarbons, as the result of which the thus treated tan extract imparts to the leather an extraordinarily light color. Larger or smaller amounts of the sulfoacid resin are added to the tanning extract according to the degree of lightness desired.

The following example is illustrative:

I kilogram of fluid mangrove extract of about 22° Bé is mixed, while being warmed, with 50 grams of the sulfo-acid-resin. For hastening the reaction the heating can be done under pressure.

I claim:

1. The process of preparing tanning means from the acid residue of mineral oil refining, which consists in treating said residue with a quantity of hydrocarbon corresponding to the excess of sulphuric acid present and heating the same to complete water solubility in the presence of means favorable to condensation, and subsequently treating the product thus formed with an excess of alkali.

2. The process of preparing tanning means from the acid residue of mineral oil refining, which consists in treating said residue with a quantity of hydrocarbon corresponding to the excess of sulphuric acid present and heating the same to complete water solubility in the presence of formaldehyde and subsequently treating the product thus formed with an excess of alkali.

3. The process of preparing tanning means which comprises preparing products of sulphonated hydrocarbons and causing the same to act upon vegetable tanning material under the influence of heat and pressure whereby the said vegetable tanning material is bleached and its solubility increased.

4. The process of preparing tanning means which comprises preparing products of sulphonated hydrocarbons and causing the same to act upon mangrove extract under the influence of heat and pressure whereby the mangrove extract is bleached and its solubility increased.

5. The improvement in the art of tanning which comprises treating a tannable body with a sulphonated anthracene hydrocarbon to which a vegetable tanning material has been added, a large part of which is in itself insoluble in water and the remainder soluble, the final material being readily soluble in water.

6. A tanning material comprising a sulphonated hydrocarbon combined by means of heat and pressure with a vegetable tanning material, whereby the said vegetable tanning material is bleached and its solubility increased.

7. A tanning material comprising a sulphonated anthracene combined by means of heat and pressure with a vegetable tanning material, whereby the said vegetable tanning material is bleached and its solubility increased.

8. A tanning material comprising a sulphonated hydrocarbon combined by means of heat and pressure with a mangrove extract, whereby the said mangrove extract is bleached and its solubility increased.

9. A tanning material comprising a sulphonated anthracene combined by means of heat and pressure with a mangrove extract, whereby the said mangrove extract is bleached and its solubility increased.

In testimony whereof I have hereunto set my hand in the presence of two subscribing witnesses this 17th day of March, 1915.

WILLY MOELLER.

Witnesses:
CARL RENNER,
MARC REINPOLD.